Figure 1:
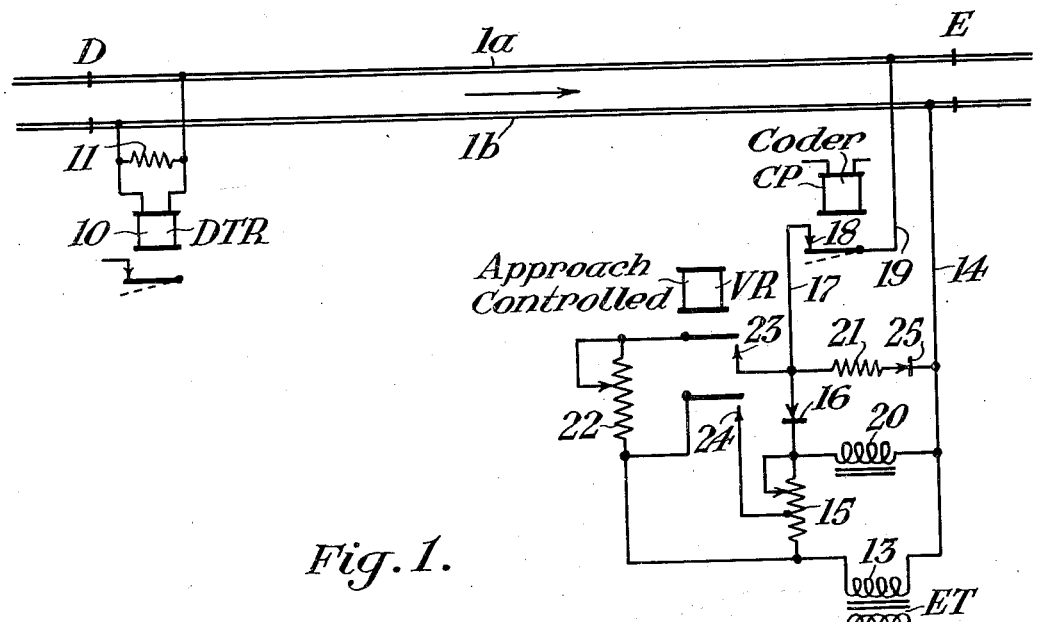

March 29, 1949.  P. N. MARTIN  2,465,691
TRACK CIRCUIT APPARATUS
Filed Dec. 12, 1945

INVENTOR
Paul N. Martin.
BY
HIS ATTORNEY

Patented Mar. 29, 1949

2,465,691

UNITED STATES PATENT OFFICE 2,465,691

TRACK CIRCUIT APPARATUS

Paul N. Martin, Penn Township, Allegheny County, Pa., assignor to The Union Switch & Signal Company, Swissvale, Pa., a corporation of Pennsylvania Application December 12, 1945, Serial No. 634,462

13 Claims. (Cl. 246—34)

My invention relates to track circuit apparatus, and more particularly to track circuit apparatus for controlling both wayside and cab signals.

In railway signaling systems the track circuit of a track section is frequently supplied with direct current for energizing the track relay when the section is unoccupied and with alternating current for operating a cab signal when a train occupies the section. The safety requirements of railway signaling make it necessary that a track circuit have definite operating characteristics, and the manner for meeting these operating characteristics is different for the different forms of energy used. That is, a track circuit for energizing a direct current track relay and a track circuit for operating cab signals require adjustments that are interrelated in some features and are independent in other features.

Furthermore, when a track circuit is to be supplied with direct current for one function and with alternating current for a second function, it is in the interest of simplicity and economy if a single source of power can be used to accomplish the two functions. It has been proposed to use a half wave rectifier with an alternating current source for supplying a track circuit with half wave rectified current, such current having a direct current component suitable for energizing a direct current relay and an alternating component suitable for inductive control of a cab signal. Such a half wave rectified current arrangement requires special attention as to the power consumed, matching of axle current for cab signal operation and working current for the direct current track relay, broken rail and train shunt protection, chattering of relay contacts under high ballast resistance, and size of apparatus.

In view of the foregoing conditions, a feature of my invention is the provision of novel and improved track circuit apparatus for supplying a track circuit with current for energizing a direct current track relay and for inductive control of a cab signal.

Another feature of my invention is the provision of novel and improved apparatus using a half wave rectifier to supply a track circuit with current from an alternating current source for energizing a track relay and operation of a cab signal.

Another feature of my invention is the provision of novel apparatus for supplying a circuit, such as a track circuit, the impedance of which varies from time to time, with a substantially constant average value of direct current from an alternating current source.

Other features, objects and advantages of my invention will appear as the specification progresses.

The foregoing features, objects and advantages of my invention are obtained by the provision of a novel circuit network for connecting a track transformer to the track rails, such circuit network being provided with different paths including reactance and resistance connected to the track lead wires in such a manner that certain elements serve to control the direct current component of the half wave rectified current supplied to the rails and other elements serve to control the alternating current component.

I shall describe two forms of apparatus embodying my invention, and shall then point out the novel features thereof in claims.

Figure 2:
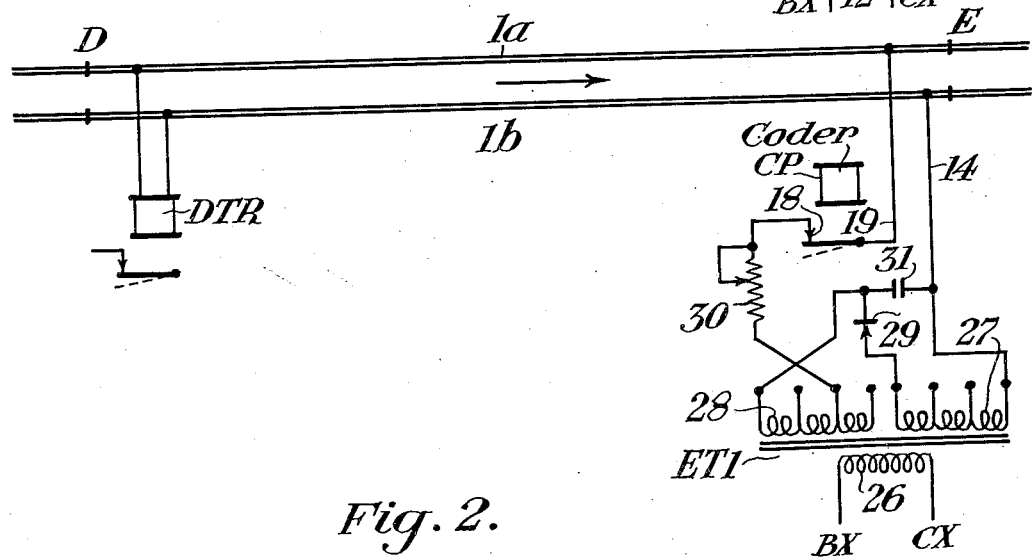

In the accompanying drawings, Figs. 1 and 2 are diagrammatic views showing two different forms of apparatus, each of which embodies my invention.

In each of the two views like reference characters are used to designate similar parts.

Referring to Fig. 1, the reference characters $1a$ and $1b$ designate the track rails of a railway over which traffic normally moves in the direction indicated by an arrow and which rails are formed in the usual manner with a track section D—E, the section D—E being one section of a series of track sections of a signaling system. The rails $1a$ and $1b$ are bonded and arranged to be included in a track circuit which also includes a track relay connected across the rails at one end of the section and a source of power connected across the rails at the other end of the section.

In Fig. 1, the track relay is a direct current code following relay DTR, a winding 10 of which is connected across the rails adjacent the entrance end D of the section. the relay DTR being of any one of several well-known types of direct current code following relays. For reasons to appear hereinafter, a resistor 11 is preferably connected in multiple with winding 10 of relay DTR.

The source of power comprises a track transformer ET having a primary winding 12 connected to a source of alternating current, such as a generator not shown. The alternating current source may be a commercial power line supplying a 60 cycle current, but preferably the source of power would supply a current of 100 cycles since 100 cycle alternating current is preferably used in railway signal systems of the type here involved. In Fig. 1, the two terminals of the alternating current source are designated BX and CX in the customary manner. It is to be understood that the invention is not limited to the frequencies just mentioned and alternating currents of other frequencies can be used.

A secondary winding 13 of transformer ET is connected across the rails of section D—E adjacent to the exit end E through a circuit network including lead wires 14 and 19 and several circuit paths connected between the lead wires. One terminal, the right-hand terminal as viewed in Fig. 1, of secondary winding 13 is connected to rail 1b through lead wire 14, and the other terminal of the winding 13 is connected to rail 1a through a resistor 15, a half wave rectifier 16, wire 17, contact 18 of a coder or code repeater relay CP and lead wire 19. A reactor 20 preferably comprising a winding mounted on a magnetizable core, is connected between lead wire 14 and the junction terminal of resistor 15 and rectifier 16. A path including a resistor 22 and a normally open contact 23 of an approach controlled relay VR is connected in shunt with resistor 15 and rectifier 16, and a portion of resistor 15 is shunted through a normally open contact 24 of relay VR. A path comprising a resistor 21 and a rectifier 25 in series is connected between lead wire 14 and wire 17.

It is clear that with this circuit network a half wave rectified current is supplied from secondary winding 13 of transformer ET to the track circuit such current having a direct current component and an alternating current component. The resistor 15 and rectifier 16 in series form a connection such as heretofore used for supplying rectified current to a track circuit from an alternating source of supply, the resistor 15 serving as a current limiting resistor. This arrangement heretofore used requires a moderately high volt-ampere input to operate the track relay and such input does not provide the desired axle current for operation of cab signals, an axle current of the order of two amperes being that desired in many present day cab signal systems. If the resistor 15 is adjusted to provide the desired axle current, then the track relay is over energized and such over energizing of the track relay not only reduces the effectiveness of the relay but also reduces broken rail protection. Again, with this arrangement heretofore used there is a large difference between the volt-ampere output from the secondary winding and the input taken by the primary winding due to the saturation of the transformer core because of the unidirectional current in the secondary winding.

The reactor 20 interposed in the circuit network in the manner disclosed in Fig. 1 results in a considerable increase both to the direct current component and the alternating current component of the track circuit current with the same transformer voltage. Also, the direct current saturation created in the track transformer core becomes negligible. The result thus obtained by adding reactor 20 to the network can be explained in that the reactor stores energy on the half cycle the rectifier is blocking and gives up this energy to the track circuit on the other half cycle. The power lost in limiting resistor 15 is reduced because the current through it alternates instead of flowing in unidirectional impulses of approximately twice the peak value. The reactor 20 provides a multiple path through which most of the direct current component flows rather than through the secondary winding of the transformer. These features thus provided by the reactor 20 considerably increase both the direct current component and the alternating current component as stated hereinbefore, without increasing the voltage required by the transformer.

It should also be noted that the shunt reactor 20 also serves to reduce the burden of the rectifier in that it reduces the inverse voltage across the rectifier on the half cycles it is blocking the flow of current, so that a smaller rectifier can be used.

The path through resistor 22 and contact 23 of approach controlled relay VR forms an alternative path for the alternating current around the rectifier and the alternating current component of the track circuit is increased to insure that the two ampere axle current desired for operation of cab signals is obtained. This path permits adjustment of the alternating current component without increasing the direct current component. With the shunt path controlled through a contact of approach controlled relay VR, the resultant increase in the alternating current component supplied to the rails is effective only as a train approaches and thus permits a saving of power, but it is clear that the approach controlled relay contact of this path through resistor 22 can be omitted and the path permanently included in the circuit network for the transformer ET. The resistor 22 is preferably provided with taps, or otherwise made adjustable, and it can be set to a value predetermined for any particular length of track circuit.

The closing of the shunt path through resistor 22 tends to reduce the direct current component of the track circuit current and in order to increase the direct current component so that the track relay may be properly reenergized when a train vacates the section, a portion of resistor 15 is preferably short circuited through contact 24 of the approach controlled relay VR, this short circuiting of a portion of resistor 15 serving to increase the direct current component supplied to the track section so that when the section is vacated there is available a sufficient energization to pick up the track relay. Such aid or increase in the direct current component by the shunting of a portion of resistor 15 may not be required.

At high ballast resistance, that is, conditions corresponding to frozen or very dry ballast, the contacts of the track relay tend to chatter because of the pulsating nature of half wave rectified current, and preferably, resistor 11 is connected in multiple with the winding of the track relay to improve the operation of the relay.

When leakage resistor 22 is used as explained hereinbefore and high ballast resistance prevails, chattering of the relay contacts may occur even when resistor 11 is provided. To improve conditions, the path including resistor 21 and half wave rectifier 25 is included in the circuit network by which the transformer is connected to the track rails. The rectifier 25 reduces the power consumed by the path through resistor 21 and still allows the path a provide a means of dissipating the inductive energy stored in the rail circuit in a controlled manner and aid in keeping the relay contacts from chattering.

It is pointed out that the current limiting impedance 15 can be in series with the primary winding of the track transformer instead of the secondary winding. With the limiting impedance on the primary side, the secondary voltage can be lower because it does not include any voltage drop through the limiting impedance. The inverse voltage on the rectifier is thus reduced permitting use of a smaller rectifier and the direct current in the secondary winding is less effective in saturating the transformer because it flows in a smaller number of turns. The power loss in the limiting impedance is also reduced since it carries only alternating current. It is to be understood that my invention includes such use of the limiting impedance.

It follows from the foregoing that the apparatus disclosed in Fig. 1 has the advantages that the power required for a track circuit to energize a direct current track relay and operate a cab signal is limited to a moderate level, matching of the axle current for cab signal operation and working current for energizing the track relay with attention to broken rail and train shunt protection is effected, the duty imposed upon the rectifier is not severe and its size is minimized, and chattering of the contacts of the track relay under high ballast conditions is avoided.

The coder CP would be governed in the well-known manner and may be arranged to provide different code rates according to different traffic conditions. Also, the coder may be omitted and relay DTR and the cab signal of the non code type.

In Fig. 2 the track rails 1a and 1b are formed with a track section D—E provided with a track circuit the same as in Fig. 1, except for the circuit network through which the track transformer is connected to the rails. In Fig. 2, a track transformer ET1 is provided with a primary winding 26 connected to terminals BX and CX of the power source and with two secondary windings 27 and 28, each of which secondary windings is preferably provided with taps. Secondary windings 27 and 28 in series opposition are connected across the rails through lead wires 14 and 19, a half wave rectifier 29, a current limiting resistor 30 and contact 18 of coder CP being interposed in the lead wire 19. The portions of secondary windings 27 and 28 included in the circuit connection are preselected according to the specific conditions of the track circuit. A capacitor 31 of relatively large preselected capacitance is connected in series with secondary winding 27 and rectifier 29.

The direct current components in the two secondary windings 27 and 28 flow in opposite directions, reducing saturation effects of the transformer core. The capacitor 31 is charged during one half cycle of the current and discharge in series with secondary winding 28 during the other half cycle. Capacitor 31 thus serves to complete the output path for the alternating current component supplied by winding 28, and also serves as a means of introducing the direct current component for rectifier 29 and winding 27 into the output.

This circuit network of Fig. 2 tends to maintain a constant direct current output regardless of load resistance and permits an adjustment that will give the desired axle current for cab signal operation without over energizing the track relay by the direct current component.

It is clear that the apparatus disclosed in Fig. 2 provides substantially the same advantages obtained by the apparatus of Fig. 1.

Although I have herein shown and described but two forms of track circuit apparatus embodying my invention, it is understood that various changes and modifications may be made therein within the scope of the appended claims without departing from the spirit and scope of my invention.

Having thus described my invention, what I claim is:

1. In combination, a track section through which trains having cab signals move in a given direction; said section formed with a track circuit including the track rails and a direct current track relay, said relay connected across the rails adjacent the entrance end of said section, a source of alternating current connected across the rails adjacent the exit end of said section through a current limiting impedance and a half wave rectifier to supply a track circuit with current having a direct current component for energizing said track relay when the section is unoccupied and an alternating current component for operation of a cab signal when a train moves through the section, and a reactance device interposed in the connection to be in multiple with the source and limiting impedance to store energy one half cycle of the alternating current and to give up such energy to the track circuit during the other half cycle of the alternating current.

2. In combination, a track section through which trains equipped with cab signals move in a given direction; said section formed with a track circuit including the track rails, a track relay and a track transformer; said relay being a direct current relay and connected across the rails adjacent the entrance end of the section, said transformer having a primary winding connected to terminals of a source of alternating current and a secondary winding connected across the rails adjacent the exit end of the section through a half wave rectifier to supply to the track circuit current having a direct current component for energizing said relay when the section is unoccupied and an alternating current component for operation of a cab signal when a train moves through the section, and means including a resistor connected in series with said secondary winding and a reactance connected in multiple with said secondary winding and said resistor for increasing said direct current and alternating current components for a given power supplied.

3. In combination, a track section formed with a track circuit including the track rails and a direct current relay connected across the rails adjacent the entrance end of the section, a track transformer having a primary winding receiving an alternating current, a circuit network including a half wave rectifier and a resistor in series to connect a secondary winding of said track transformer across the rails adjacent the exit end of said section to supply a track circuit current having a direct current component for energizing said track relay when the section is unoccupied and an alternating current component for operation of a cab signal when a train occupies the section, and a reactor comprising a winding mounted on a magnetizable core connected across said secondary winding ahead of said rectifier to increase both the direct current and alternating current components of the current supplied to said track circuit for a given power supplied.

4. In combination, a track section formed with a track circuit including the track rails and a direct current track relay connected across the rails adjacent the entrance end of the section, a track transformer having a primary winding receiving alternating current and a secondary winding connected across the rails adjacent the exit end of the section through a pair of lead wires, a resistor and a half wave rectifier in series interposed in one of said lead wires with the resistor adjacent the secondary winding, and a reactor comprising a winding mounted on a magnetizable core connected between the junction terminal of said resistor and rectifier and the other one of said lead wires.

5. In combination, a track section formed with a track circuit including the track rails and a direct current track relay connected across the rails adjacent the entrance end of the section, a track transformer having a primary winding receiving alternating current and a secondary winding connected across the rails adjacent the exit end of the section through a pair of lead wires, a resistor and a half wave rectifier in series interposed in one of said lead wires with the resistor adjacent the secondary winding, a reactor comprising a winding mounted on a magnetizable core connected between the junction terminal of said resistor and rectifier and the other one of said lead wires, and another resistor connected at times in multiple with said rectifier and the first mentioned resistor.

6. In combination, a track section formed with a track circuit including the track rails and a direct current track relay connected across the rails adjacent the entrance end of the section, a track transformer having a primary winding receiving alternating current and a secondary winding connected across the rails adjacent the exit end of the section through a pair of lead wires, a first resistor and a first rectifier in series interposed in one of said lead wires to cause the current supplied to the track circuit to have a direct current component for energizing said track relay and an alternating current component for operating cab signals, a reactor connected between the junction terminal of said first resistor and first rectifier and the other lead wire to increase said direct and alternating current components for a given power supplied, a circuit path including a second resistor connected in multiple with said first resistor and first rectifier to increase said alternating current component, and another circuit path including a third resistor and a second rectifier in series connected across said lead wires at a point between said first rectifier and said track rails to control the direct current component under high ballast resistance of said section.

7. In combination, a track section formed with a track circuit including the track rails and a direct current track relay connected across the rails adjacent the entrance end of the section, a track transformer having a primary winding receiving alternating current and a secondary winding connected across the rails adjacent the exit end of the section through a pair of lead wires, a first resistor and a first rectifier in series interposed in one of said lead wires to cause the current supplied to the track circuit to have a direct current component for energizing said track relay and an alternating current component for operating cab signals, a reactor connected between the junction terminal of said first resistor and first rectifier and the other lead wire to increase said direct and alternating current components for a given power supplied, a circuit path including a second resistor connected in multiple with said first resistor and first rectifier to increase said alternating current component, and circuit means including a third resistor and a second rectifier in series connected across said lead wires in multiple with the track rails and a fourth resistor connected in multiple with said track relay to govern the direct current component supplied to the track relay under high ballast resistance of said section.

8. In combination, a track section formed with a track circuit including the track rails and a direct current track relay connected across the rails adjacent the entrance end of the section, a track transformer having a primary winding receiving alternating current and a secondary winding connected across the rails adjacent the exit end of the section through a pair of lead wires, a first resistor and a half wave rectifier in series interposed in one of said lead wires with the resistor adjacent said secondary winding, the current supplied to said track circuit through said first resistor and rectifier having a direct current component for energizing said track relay and an alternating current component for operation of cab signals, a reactor connected between the junction terminal of said first resistor and rectifier and the other one of said lead wires to increase both the direct and alternating current components for a given power supplied, a circuit path including a second resistor and a normally open contact connected around said first resistor and rectifier to provide an increase in the alternating current component upon closure of said contact, and means responsive to traffic conditions to close said contact.

9. In combination, a track section formed with a track circuit including the track rails and a direct current track relay connected across the rails adjacent the entrance end of the section, a track transformer having a primary winding receiving alternating current and a secondary winding connected across the rails adjacent the exit end of the section through a pair of lead wires, a first resistor and a half wave rectifier in series interposed in one of said lead wires with the resistor adjacent said secondary winding, said track circuit being supplied with rectified current having a direct current component for energizing said track relay and with an alternating current component for operation of cab signals, a reactor connected between the junction terminal of said first resistor and rectifier and the other lead wire to increase the direct and alternating components of the track circuit current for a given power supplied and to reduce the saturation of the core of said transformer, a circuit path including a second resistor and a first contact connected around said first resistor and rectifier to increase said alternating component upon closure of said contact, means including a second contact to shunt a portion of said first resistor to increase at times said direct current component, and traffic governed means to control said first and second contacts.

10. In combination, a track circuit including the rails of a track section and a direct current track relay connected across the rails, a track transformer having a primary winding and a first and a second secondary winding, said primary winding having connections to receive an alternating current, circuit means including a half wave rectifier and a capacitor in series connected across said first secondary winding to maintain a direct voltage across said capacitor; other circuit means including in series said capacitor, said second secondary winding and a limiting impedance connected across the rails of said track circuit to supply the track circuit with current having a direct current component and an alternating current component due to said capacitor being common to both of said circuit means.

11. In combination, a track section formed with a track circuit including the track rails and a direct current track relay connected across the rails at the entrance end of the section, a track transformer having a primary winding powered from an alterating current source, said transformer having a first and a second secondary winding, circuit means including a half wave rectifier and a resistor to connect said secondary windings across the rails at the exit end of the section to supply the track circuit with rectified current having a direct current component to energize said track relay and an alternating component to operate cab signals, said secondary windings interposed in said circuit means in series opposition to reduce the saturation of the transformer core, and a capacitor connected in parallel with the rectifier and the first secondary winding to provide a path for the desired alternating current component.

12. In combination, a circuit having variable impedance, a transformer having a primary winding and a first and a second secondary winding, said primary winding having connections for receiving power from an alternating current source, a capacitor, a rectifier, a current limiting impedance, said capacitor and rectifier connected in series across said first secondary winding to maintain a direct voltage across the capacitor; means to connect said capacitor, said second secondary winding and said limiting impedance in series to said circuit to supply thereto current having a substantially constant average value of direct current component; and said first and second secondary windings being so connected that the direct current component flowing in them creates magnetizing forces that oppose each other.

13. In combination, a track section the rails of which are included in a track circuit and through which section a train equipped with inductive cab signals at times moves in a given direction, a direct current track relay connected across the rails adjacent the entrance end of the section, a source of alternating current, a transformer having a winding receiving energy from said source, a half wave rectifier, a current limiting impedance, a circuit connection including said rectifier and said current limiting impedance to connect at least one winding of said transformer across the rails adjacent the exit end of said section to supply to the rails half wave rectified current for energizing said track relay when the section is unoccupied and for operation of the cab signals when the train moves through the section, and a reactance device connected across said circuit connection in such a manner that due to said rectifier energy is stored therein during one-half cycle of the alternating current and the stored energy is supplied to the track rails along with energy from the transformer during the other half cycle of the alternating current.

PAUL N. MARTIN.

REFERENCES CITED

The following references are of record in the file of this patent:

UNITED STATES PATENTS

| Number | Name | Date |
| --- | --- | --- |
| 1,921,786 | Suits | Aug. 8, 1933 |
| 2,001,047 | Witmer | May 14, 1935 |
| 2,045,992 | Nicholson | June 30, 1936 |
| 2,123,966 | Rees | July 19, 1938 |
| 2,155,343 | Bonanno | Apr. 18, 1939 |
| 2,303,786 | Bonanno | Dec. 1, 1942 |
| 2,328,241 | Wight | Aug. 31, 1943 |
| 2,332,279 | Thompson | Oct. 19, 1943 |